US010997610B2

(12) United States Patent
Sakashita (10) Patent No.: US 10,997,610 B2
(45) Date of Patent: May 4, 2021

(54) SYSTEMS AND METHODS FOR USING A PRODUCT HISTORY TO CREATE A LINGUISTIC CORPUS FOR A PRODUCT

(71) Applicant: Disney Enterprises, Inc., Burbank, CA (US)

(72) Inventor: Tadashi Sakashita, Cottonwood Heights, UT (US)

(73) Assignee: Disney Enterprises, Inc., Burbank, CA (US)

( * ) Notice: Subject to any disclaimer, the term of this patent is extended or adjusted under 35 U.S.C. 154(b) by 1090 days.

(21) Appl. No.: 14/532,943

(22) Filed: Nov. 4, 2014

(65) Prior Publication Data

US 2016/0125428 A1    May 5, 2016

(51) Int. Cl.
*G06Q 30/02*    (2012.01)

(52) U.S. Cl.
CPC ............................... *G06Q 30/0201* (2013.01)

(58) Field of Classification Search
None
See application file for complete search history.

(56) References Cited

U.S. PATENT DOCUMENTS

| 7,209,923 | B1 * | 4/2007 | Cooper | G06F 16/285 |
| 8,335,708 | B1 * | 12/2012 | Barzilay | G06Q 30/0242 |
| | | | | 705/7.29 |
| 9,912,664 | B1 * | 3/2018 | Lam | G06F 21/10 |
| 2003/0014318 | A1 * | 1/2003 | De La Motte | G06Q 30/0601 |
| | | | | 705/26.1 |
| 2007/0208625 | A1 * | 9/2007 | Walker | G06Q 30/0208 |
| | | | | 705/17 |
| 2008/0162157 | A1 * | 7/2008 | Daniluk | G06Q 99/00 |
| | | | | 705/1.1 |
| 2009/0055139 | A1 * | 2/2009 | Agarwal | G06Q 10/04 |
| | | | | 703/2 |
| 2010/0153187 | A1 * | 6/2010 | Ghani | G06Q 30/02 |
| | | | | 705/14.53 |
| 2013/0246430 | A1 * | 9/2013 | Szucs | G06F 16/313 |
| | | | | 707/738 |

OTHER PUBLICATIONS

Sepielak, Katarzyna. 2014. Department of Translation and Interpreting and East Asian Studies, Autonomous University of Barcelona.*

* cited by examiner

*Primary Examiner* — Arif Ullah
(74) *Attorney, Agent, or Firm* — Farjami & Farjami LLP

(57) ABSTRACT

There is provided a system having a memory for storing a software application, where the software application includes a product database. The product database includes a product history for a plurality of products. A processor is configured to execute the software application. The software application receives product requirements for a new product, determines at least one related product from the plurality of products based on the product requirements for the new product, evaluates the product history of the at least one related product to determine a linguistic corpus for the new product, and creates the linguistic corpus for the new product.

16 Claims, 5 Drawing Sheets

SYSTEMS AND METHODS FOR USING A PRODUCT HISTORY TO CREATE A LINGUISTIC CORPUS FOR A PRODUCT

BACKGROUND

Products that utilize a linguistic corpus enter the marketplace each and every day. Usually, the companies creating the products have to guess as to what linguistic, translation, and social rules will work best with a given product. In addition, many current translation and linguistic memory banks implemented in products are unspecific and general, and thus do not take into account the many potential uses and understandings of words or phrases. For example, a word or phrase may come across one way to a child and another to an adult, or may come across one way to a fan of animated films.

Furthermore, social interactions occur in online environments constantly, and many of these social interactions occur between users not only from different countries, but also who speak entirely different languages. However, modern translation softwares, especially translation softwares that translate gender and socially neutral languages, fail to account for necessary translational changes for languages that are dependent on social hierarchies and gender, for example.

SUMMARY

The present disclosure is directed to systems and methods for using a product history to create a linguistic corpus for a product, substantially as shown in and/or described in connection with at least one of the figures, as set forth more completely in the claims.

DETAILED DESCRIPTION OF THE INVENTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
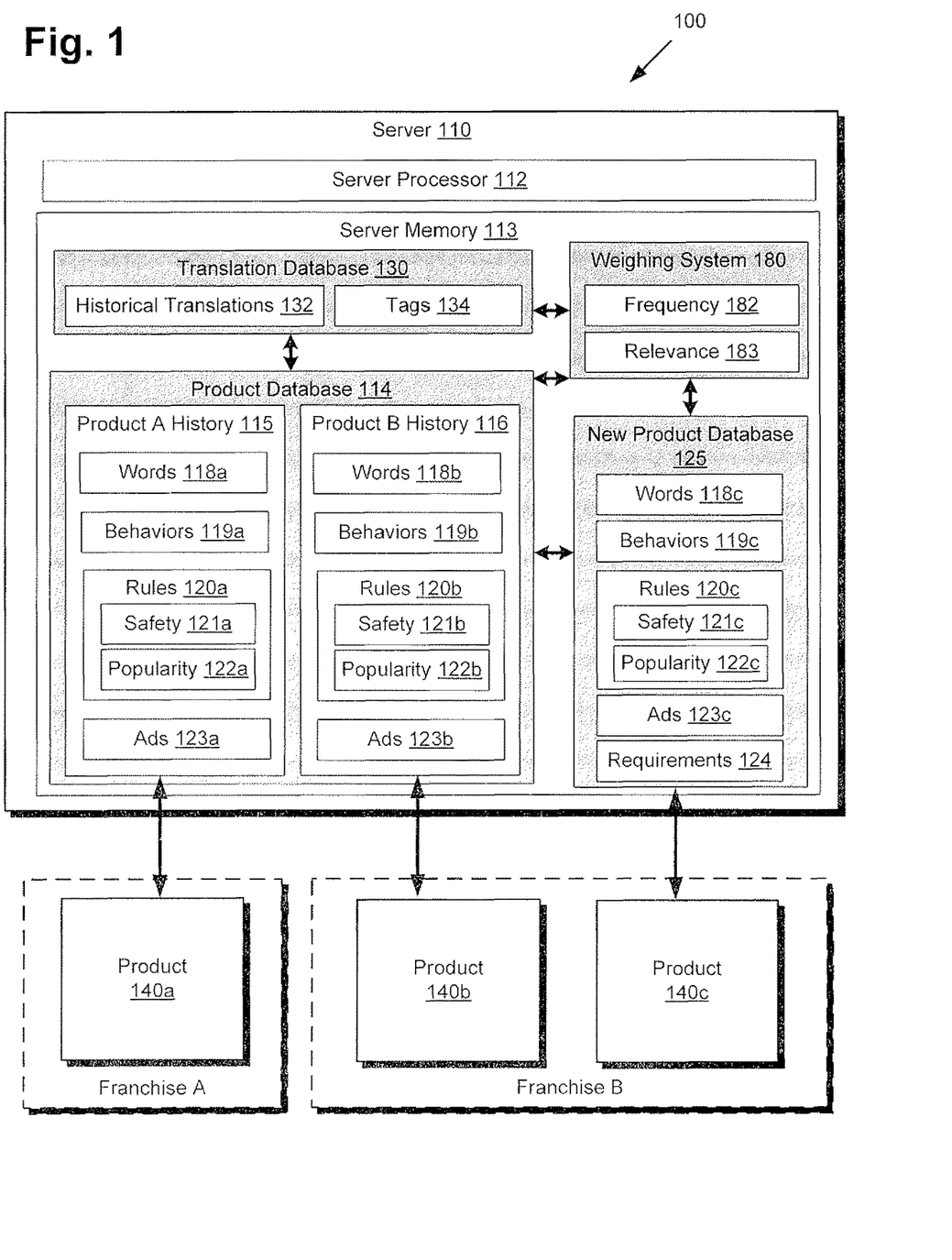
FIG. 1 presents a system for using a product history to create a linguistic corpus for a product, according to one implementation of the present disclosure.

FIG. 1 presents a system for using a product history to create a linguistic corpus for a product, according to one implementation of the present disclosure. System 100 of FIG. 1 includes server 110, product 140a, product 140b, and product 140c. Server 110 includes server processor 112 and server memory 113. Server memory 113 includes translation database 130, product database 114, weighing system 180, and new product database 125. Translation database 130 includes historical translations 132 and tags 134. Product database 114 includes product A history 115 and product B history 116. Product A history 115 includes words 118a, behaviors 119a, rules 120a, and ads 123a. Rules 120a includes safety 121a and popularity 122a. Product B history 116 includes words 118b, behaviors 119b, rules 120b, and ads 123b. Rules 120b includes safety 121b and popularity 122b. Weighing system 180 includes frequency 182 and relevance 183. New product database 125 includes words 118c, behaviors 119c, rules 120c, ads 123c, and requirements 124. Rules 120c includes safety 121c and popularity 122c.

It should be noted that words 118a, words 118b, and words 118c are collectively referred to as words 118, behaviors 119a, behaviors 119b, and behaviors 119c are collectively referred to as behaviors 119, rules 120a, rules 120b, and rules 120c are collectively referred to as rules 120, safety 121a, safety 121b, and safety 121c are collectively referred to as safety 121, popularity 122a, popularity 122b, and popularity 122c are collectively referred to as popularity 122, ads 123a, ads 123b, and ads 123c are collectively referred to as ads 123 and product 140a, product 140b, and product 140c are collectively referred to as products 140.

Although server 110 of FIG. 1 includes translation database 130, product database 114, and new product database 125, the present disclosure is not intended to be limited to the implementation of FIG. 1. In some implementations there may be more than one server. For example, translation database 130, product database 114, and new product database 125 may each be located on their own server. Additionally, in some implementations, server 110 may include features in addition to server processor 112 and server memory 113.

Server 110 includes server processor 112 and server memory 113. Server processor 112 may be configured to access server memory 113 to execute commands, processes, or programs stored in server memory 113. Server processor 112 may correspond to a processing device, such as a microprocessor or similar hardware processing device, or a plurality of hardware devices. Server memory 113 is a hardware memory capable of storing commands, processes, and programs for execution by server processor 112. Server memory 113 may be hardware or software and may be instituted as ROM, RAM, flash memory, or any sufficient memory capable of storing a set of instructions. In other implementations, server memory 113 may correspond to a plurality of memory types or modules.

As illustrated in FIG. 1, server 110 is configured to receive information relating to product 140a, product 140b, and product 140c, along with franchise information associated with franchises, including franchise A and franchise B. Server 110 may be a local server or may be a network server for communication over a network. Server 110 may be configured to dynamically update product database 114 and products 140 over time. However, in some implementations, server 110 may be configured to provide products 140 with product information a single time.

Products 140 can be any type of products, such as an online game, a computer game, a mobile application, a movie, a toy, or sports items, for example. In some implementations, products 140 may include chat capabilities, or include written and/or verbal commands. Each of products 140 may have associated features such as websites, blogs, forums, company generated content, and/or other features. When referring to products 140 throughout this application, products 140 include the product itself and the associated features.

Franchise A and franchise B are shown with dotted lines as a clarification that franchise A and franchise B may or may not be present in certain implementations. In addition, product 140a, product 140b, and product 140c may or may not belong to franchise A, franchise B, or to any other franchise. Franchise A and franchise B may be a movie franchise, such as "Movie1," or a game franchise, such as "Game1," for example.

As shown in FIG. 1, server 110 includes product database 114. Server 110 may utilize product database 114 to store the product history for different products, such as product A history 115 of product 140a and product B history 116 of product 140b. Product database 114 is configured to communicate with weighing system 180, translation database 130, and new product database 125. Although product database 114 is only shown to include product A history 115 and product B history 116, product database 114 may be configured to store any number of product histories. In addition, server 110 may include more than one product database 114.

Product A history 115 and product B history 116 are configured to receive product history information from product 140a and product 140b, respectively. Product A history 115 and product B history 116 may be updated dynamically over time as new product history is created. As such, product A history 115 and product B history 116 may accurately reflect the current product history of product 140a and product 140b, respectively, at all times. However, in some implementations, product A history 115 and product B history 116 may be the only product histories that were included in product 140a and product 140b, respectively, at the time of their creation.

Words 118 for products 140 may include at least some of the words and phrases used by users of products 140 in conjunction with or in reference to products 140. As such, words 118 may be words and phrases gathered from the websites, blogs, forums, company generated content, and/or other features. For example, the words and phrases associated with the "Movie1" franchise may be character names, sayings from the movie, or words and phrases created or associated with the franchise by the users of products 140.

Behaviors 119 for products 140 may include certain uses of products 140, or may include actual behaviors exhibited by users of products 140. For example, behaviors 119 may include motions or manipulations of products 140, or may include positive and/or negative attitudes associated with certain features of products 140.

Rules 120 for products 140 are a set of rules for use with products 140, including the associated websites, blogs, forums, company-generated content, and/or other features of products 140. Rules 120 are used to create products 140 that are tailored to the proper age of users, location of users, franchise, or other attributes of products 140. Although FIG. 1 includes safety 121 and popularity 122 within rules 120, rules 120 are not limited to the implementation of FIG. 1. In some implementations, rules 120 may include additional types of rules, such as behavioral rules, or advertising rules.

Safety 121 includes rules 120 with linguistic restrictions based on words 118 and behaviors 119. As such, safety 121 includes rules 120 implemented to restrict or to allow certain words and phrases associated with products 140. Safety 121 may be based on more than just the words themselves, and safety 121 may be implemented based off an age group, a location, a gender, and/or other attributes of the users associated with products 140.

For example, safety 121 may be a restriction on using the word "banana" if it is used in an improper way, but may allow the word "banana" if it is used in an appropriate way. In such an example, safety 121 may include allowing "banana" if the verb before "banana" in the sentence is an allowable verb in conjunction with "banana", but may disallow "banana" if the verb before "banana" is not an allowable very in conjunction with "banana."

Although safety 121 generally includes linguistic restrictions, safety 121 may also relate to ads 123, pictures, videos, and/or other content types. For example, certain ads 123 may be restricted for users under a certain age, while other ads may be restricted for users over a certain age. If one of ads 123 is for a children's game, and one of products 140 was designed for teenagers, safety 121 may restrict the one of ads 123 so that the one of products 140 does not include the one of ads 123.

Popularity 122 includes rules 120 based on the popularity of words 118, behaviors 119, ads 123, videos, photos, and/or other attributes of products 140. Some attributes may be very popular, or have increased popularity at different times. For example, certain words 118, behaviors 119, and/or ads 123 may be consistently used by users of products 140. As a result, popularity 122 includes rules 120 for including the words 118, behaviors 119, and/or ads 123 for use by the users of products 140.

Ads 123 for products 140 include advertisements that are associated with products 140. Ads 123 may be for other products similar to products 140, or may be for services or products that are different than products 140. Ads 123 may be targeted to certain ages, locations, and/or genders of the users of products 140, or may be targeted based on the franchise or genre of products 140, for example. Ads 123 can be video, photo, textual, audible, and/or any other type of advertisement for presentation to the user of products 140. For example, if product 140a is a video game directed to ages 10-12, ads 123a may include a video advertisement for a "Movie1" video game that is tailored to players of ages 10-12.

Also illustrated in FIG. 1, server 110 includes translation database 130. Server 110 may utilize translation database 130 to store historical translations 132 and tags 134. Translation database 130 is configured to communicate with product database 114 and weighing system 180. Translation database 130 receives information relating to products 140 through product database 114. However, in some implementations, translation database 130 may receive product information relating to products 140 directly from products 140.

Historical translations 132 are a record of translations made throughout the time of use of products 140 and other products, which are collected and stored in translation database 130 in order to ensure more accurate translations in the future. Translations made from one language to another are more accurate if the translation takes into account the languages translated, the age of the user, the gender of the user, the location of the user, and other necessary attributes. Using the product information of products 140 and the attributes discussed above, translations of words and phrases may become more accurate over time.

For example, words 118 associated with franchise A and product 140a may become commonplace for users of product 140a, requiring the accuracy of the translations of words 118 to become more important if product 140a is going to translate effectively to users who speak different languages. As translations are made throughout the use of product 140a, the translations can be stored in historical translations 132 so that future users of product 140a and other products, such as users of product 140b, may have more accurate translations.

Tags 134 include franchise tags, age tags, gender tags, linguistic tags and/or other tags associated with products 140 and the users of products 140. The appropriate tags of tags 134 may be determined based on how the product is being used, the age, location, and gender of the user(s) of the product, and other information in order to select the most accurate translations from historical translations 132. Over time, tags 134 create associations with certain translations and when tags 134 are entered, a translation that is associated with tags 134 is selected from historical translations 132.

For example, a chat room for "Movie1" may be occupied by users who speak English and users who speak Russian, the users may be between ages 8-10, primarily male, and the chat room may be geared toward the characters of "Movie1." As a result, when an English speaking user enters a phrase into the chat, the proper translation may be chosen by using tags 134 "Movie1," "Age>7<11, "male," and "characters," which allow for a more accurate selection of a translation from historical translations 132. Once tags 134 are entered, translation database 130 provides the best translation based on tags 134 in order to account for a male, interested in the characters of "Movie" who is between ages 8 and 10. The best translation may be using more simple words, which are geared toward young males, rather than more complex words geared toward older males, for example.

Also illustrated in FIG. 1, server 110 includes weighing system 180. Server 110 may utilize weighing system 180 to calculate and weigh the features of translation database 130 and product database 114 to determine which features or translations are best for use with products 140. When determining which features or translations are best for use with products 140, weighing system 180 may utilize frequency 182 and relevance 183. Weighing system may weigh tags 134 when determining which translation is the best translation from historical translations 132. For example, weighing system 180 may give more weight to the age of the user and less weight to the gender of the user when determining which translation is the best translation. Weighing system 180 may further weigh multiple attributes at once. For example, any of tags 134, words 118, behaviors 119, and rules 120 may be weighed together by weighing system 180 in order to determine the best words 118c, behaviors 119c, translations, rules 120c, and ads 123c for new product database 125, for example.

Frequency 182 is configured to keep record of the frequency of words 118, behaviors 119, rules 120, ads 123, historical translations 132, tags 134, and other features and attributes of products 140 for use by weighing system 180. Frequency 182 is used to determine how often the features and attributes occur, and weighing system 180 uses frequency 182 in determining whether to give more or less weight to each of the features and the attributes. For example, if certain words and phrases in words 118 occur very frequently, and are either negative or positive, weighing system 180 may give greater weight to those words and phrases to ensure that rules 120 either allows or restricts those words and phrases. However, some of words 118, behaviors 119, ads 123, and/or other features may occur very frequently, but may not be related to, or critical to products 140, and thus frequency 182 for those features may not be factored into weighing system 180.

Relevance 183 is configured to determine a relevance of words 118, behaviors 119, rules 120, ads 123, historical translations 132, tags 134, and other features and attributes of products 140 for comparison by weighing system 180 to new products. For example, relevance 183 may track the age, location, and gender of users of products 140, and/or track the franchise information, tags 134, ads 123, and other information related to products 140. Relevance 183 utilizes this information to compare new products to older products, in order to determine which features and attributes are most relevant and consequently more necessary for inclusion in new products.

Also illustrated in FIG. 1, server 110 includes new product database 125. Server 110 may utilize new product database 125 to store words 118c, behaviors 119c, rules 120c, and ads 123c associated with at least one new product, such as product 140c. New product database 125 is configured to communicate with weighing system 180, product database 114, and translation database 130 in order to determine the best features and attributes to include in product 140c. New product database 125 may be updated dynamically, over time, to ensure that product 140c consistently includes the most up to date features and attributes. In addition, once new product database 125 is populated, the information included in new product database 125 may be added to product database 114 to be used with future new products.

As illustrated in FIG. 1, new product database 125 includes requirements 124. Requirements 124 of new product database 125 include product requirements for product 140c. Requirements 124 may include an age of users, a location of users, a franchise, at least one language of users, and/or other attributes and features of product 140c. Once requirements 124 are determined, new product database 125 can be populated with words 118c, behaviors 119c, rules 120c including safety 121c and popularity 122c, and ads 123c using information from translation database 130 and product database 114 calculated by weighing system 180.

For example, product 140c may be an online game having requirements 124 for males, between ages 10-12, who live primarily in the United States and Russia, having a theme of the "Movie1" franchise. As a result, new product database 125 may be populated with words 118, behaviors 119, rules 120, and ads 123 from product database 114 based on their relevance 183 and frequency 182, as calculated by weighing system 180, in view of requirements 124. In addition, tags 134 of translation database 130 may be updated with the product information included in new product database 125 in order to ensure more accurate translations are chosen from historical translations 132 for users of product 140c. Furthermore, once translations are made using product 140c, historical translations 132 can be updated with the translation information associated with tags 134 and product information of product 140c from new product database 125. As a result, products 140 have access to historical translations 132 and tags 134 that are updated based on the newest product information available, such as that from product 140c.

Figure 2:
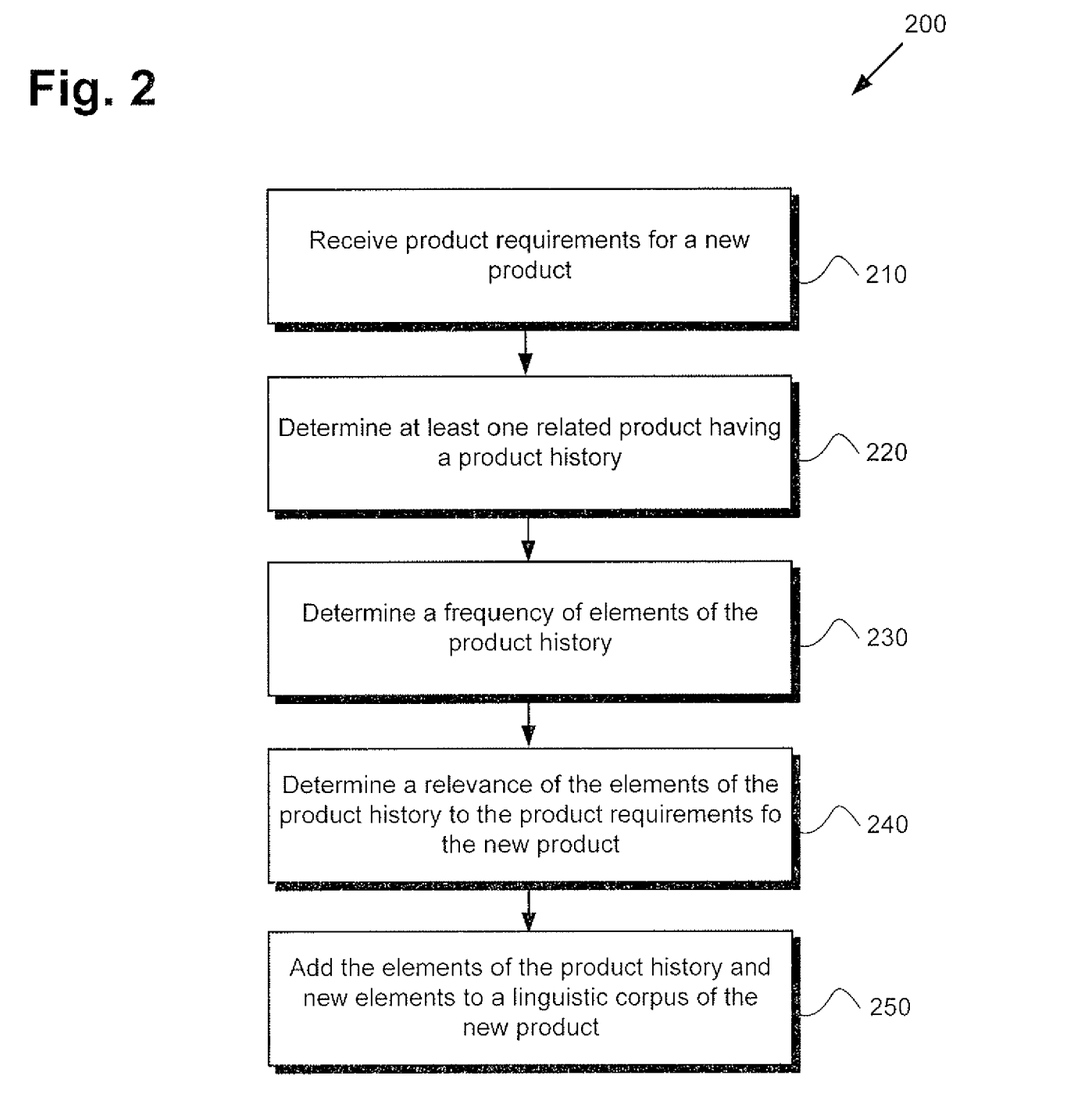
FIG. 2 presents a flowchart illustrating a method of using a product history to create a linguistic corpus for a product, according to one implementation of the present disclosure.

FIG. 2 presents a flowchart illustrating a method of using franchise and product content to support new products, according to one implementation of the present disclosure. The approach and technique indicated by flowchart 200 are sufficient to describe at least one implementation of the present disclosure, however, other implementations of the disclosure may utilize approaches and techniques different from those shown in flowchart 200. Furthermore, while flowchart 200 is described with respect to FIG. 1, the disclosed inventive concepts are not intended to be limited by specific features shown and described with respect to FIG. 1. Furthermore, with respect to the method illustrated in FIG. 2, it is noted that certain details and features have been left out of flowchart 200 in order not to obscure the discussion of inventive features in the present application.

Referring now to flowchart 200 of FIG. 2, flowchart 200 (at 210) includes receiving product requirements for a new product. For example, server processor 112 of server 110 may receive requirements 124 for product 140c.

Referring again to FIG. 2, flowchart 200 (at 220) further includes determining at least one related product having a product history. For example, server processor 112 of server 110 may determine at least one related product from product 140a and product 140b having product A history 115 and product B history 116, respectively. The at least one related product from products 140a and product 140b may include products that have similar features and attributes as product 140c, including an age of users, a location of users, a gender of users, and/or a franchise, for example. The at least one related product from product 140a and product 140b may be determined by comparing requirements 124 to the features and attributes of product database 114 using frequency 182 and relevance 183 of weighing system 180.

Referring again to FIG. 2, flowchart 200 (at 230) further includes determining a frequency of elements of the product history. For example, server processor 112 of server 110 may utilize frequency 182 of weighing system 180 to determine the frequency of elements of product A history 115 and product B history 116. Elements of the product history include words 118, behaviors 119, rules 120, and ads 123 of product A history 115, product B history 116, and/or other product histories. Frequency 182 of the elements is tracked by weighing system 180 and used in making a determination of which features and attributes to include in new product database 125 for product 140c.

Referring again to FIG. 2, flowchart 200 (at 240) further includes determining a relevance of the elements of the product history to the product requirements of the new product. For example, server processor 112 of server 110 may utilize relevance 183 of weighing system 180 to determine a relevance of the elements from product A history 115 and product B history 116 to requirements 124 of product 140c. Elements of the product history include words 118, behaviors 119, rules 120, and ads 123 of product A history 115, product B history 116, and/or other product histories. Relevance 183 is determined by weighing system 180 based on the features and attributes included in product database 114 in view of requirements 124 for product 140c.

Referring again to FIG. 2, flowchart 200 (at 250) further includes adding the elements of the product history and new elements to a linguistic corpus of the new product. For example, server processor 112 of server 110 may add the elements of product A history 115 and product B history 116 and new elements to a linguistic corpus of product 140c. Once words 118, behaviors 119, rules 120, and ads 123 have been determined based on frequency 182 and relevance 183 by weighing system 180, words 118, behaviors 119, rules 120, and ads 123 are added to new product database 125. In addition, new words 118, behaviors 119, rules 120, and ads 123 are added to new product database 125 based on requirements 124 for product 140c. As a result of new product database 125 being populated, new product database 125 becomes the linguistic corpus for product 140c.

Figure 3:
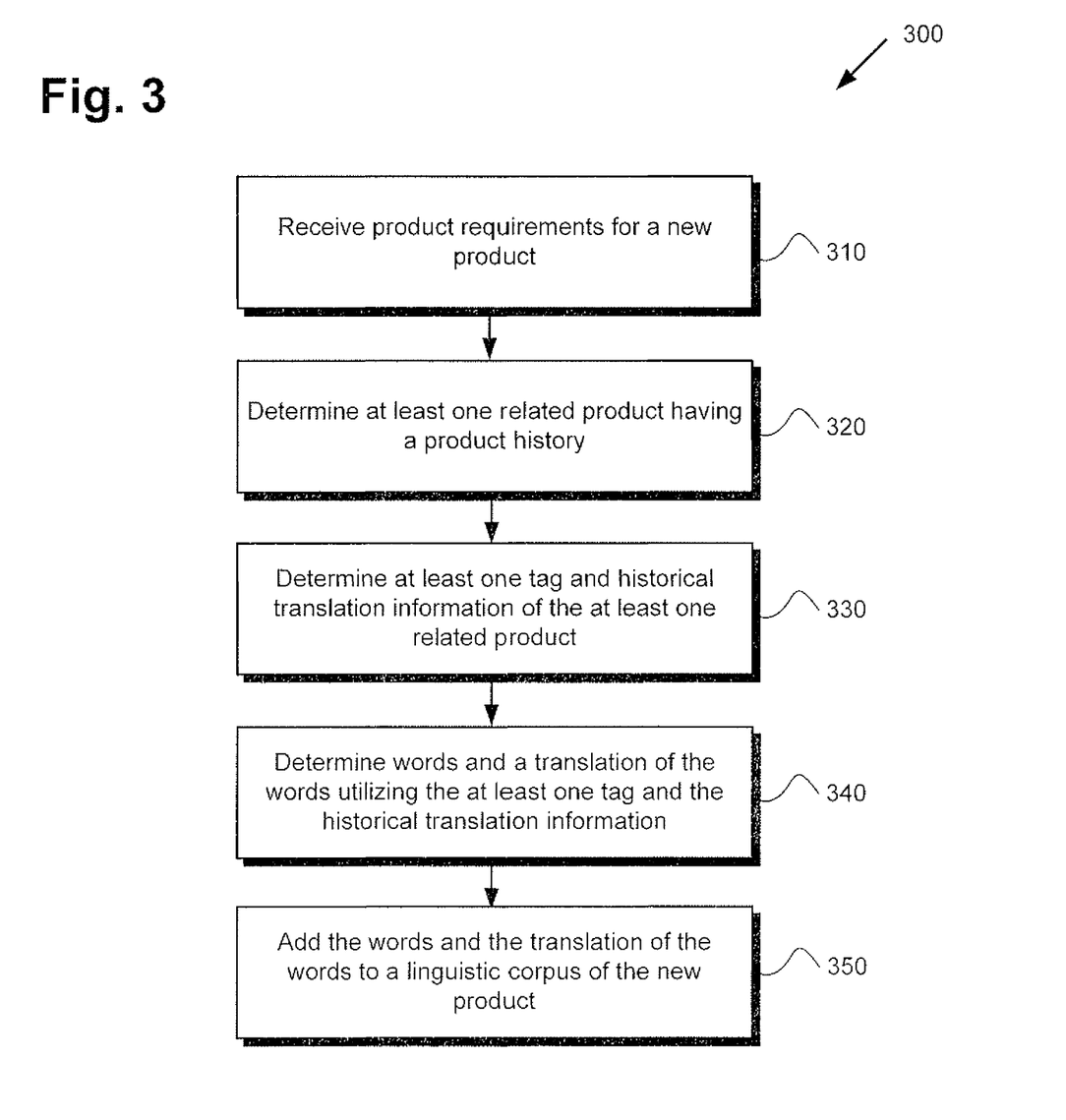
FIG. 3 presents a flowchart illustrating a method of using a product history to create a linguistic corpus for a product, according to one implementation of the present disclosure.

FIG. 3 presents a flowchart illustrating a method of using franchise, product, and linguistic content to support new products, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 1, the disclosed inventive concepts are not intended to be limited by specific features shown and described with respect to FIG. 1. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 (at 310) includes receiving product requirements for a new product. For example, server processor 112 of server 110 may receive requirements 124 for product 140c. Requirements 124 are received on server 110 and included in new product database 125. Requirements 124 may include a language or languages for use with product 140c, and further include languages most commonly associated with users of products 140 similar to product 140c.

Referring again to FIG. 3, flowchart 300 (at 320) further includes determining at least one related product having a product history. For example, processor 112 of server 110 may determine at least one related product from product 140a and product 140b having product A history 115 and product B history 116, respectively. The at least one related product may include at least one of product 140a and product 140b that has similar features and attributes as product 140c, including an age of users, a location of users, a gender of users, a language of users, and/or a franchise, for example. The at least one related product may be determined by comparing requirements 124 to historical translations 132 and tags 134 of translation database 130 using frequency 182 and relevance 183 of weighing system 180.

Referring again to FIG. 3, flowchart 300 (at 330) further includes determining at least one tag and historical translation information of the at least one related product. For example, server processor 112 from server 110 may determine at least one of tags 134 and at least one of historical translations 132 of the at least one of product 140a and product 140b. Utilizing relevance 183 of weighing system and requirements 124, for example, server 110 may determine at least one tag of tags 134 and historical translations 132 for use with product 140c. For example, if requirements 124 includes an age range of users between 10-12, server 110 may determine that a tag of ">9<13" is appropriate in order to determine the best translations from historical translations 132 for that age range with product 140c.

Referring again to FIG. 3, flowchart 300 (at 340) further includes determining words and a translation of the words utilizing the at least one tag and the historical translation information. For example, server processor 112 of server 110 may determine words 118c and a translation of words 118c using the at least one of tags 134 and the at least one of historical translations 132. Words 118c and the translation of words 118c may be determined based on the at least one tag of tags 134 and historical translations 132 in order to include the most accurate translations for users of product 140c. For example, if the tag is ">9<13" then the words 118c chosen will be based on appropriate words for that age range, and the translation of words 118c will also be based on that age range. As such, the users of product 140c will experience translations that are understandable and suitable for them.

Referring again to FIG. 3, flowchart 300 (at 350) further includes adding the words and the translation of the words to a linguistic corpus of the new product. For example, processor 112 of server 110 may add words 118c and the translation of words 118c to a linguistic corpus of product 140c. Words 118c and a translation of words 118c may be added to new product database 125 in order to ensure accurate translations are made for user of product 140c. In addition, words 118c may be dynamically updated as the users and terminology associated with product 140c change and as historical translations 132 are updated based on product history of products 140. Rules 120c may also be updated to account for information pertaining to words 118c and translations of words 118c in new product database 125.

Figure 4:
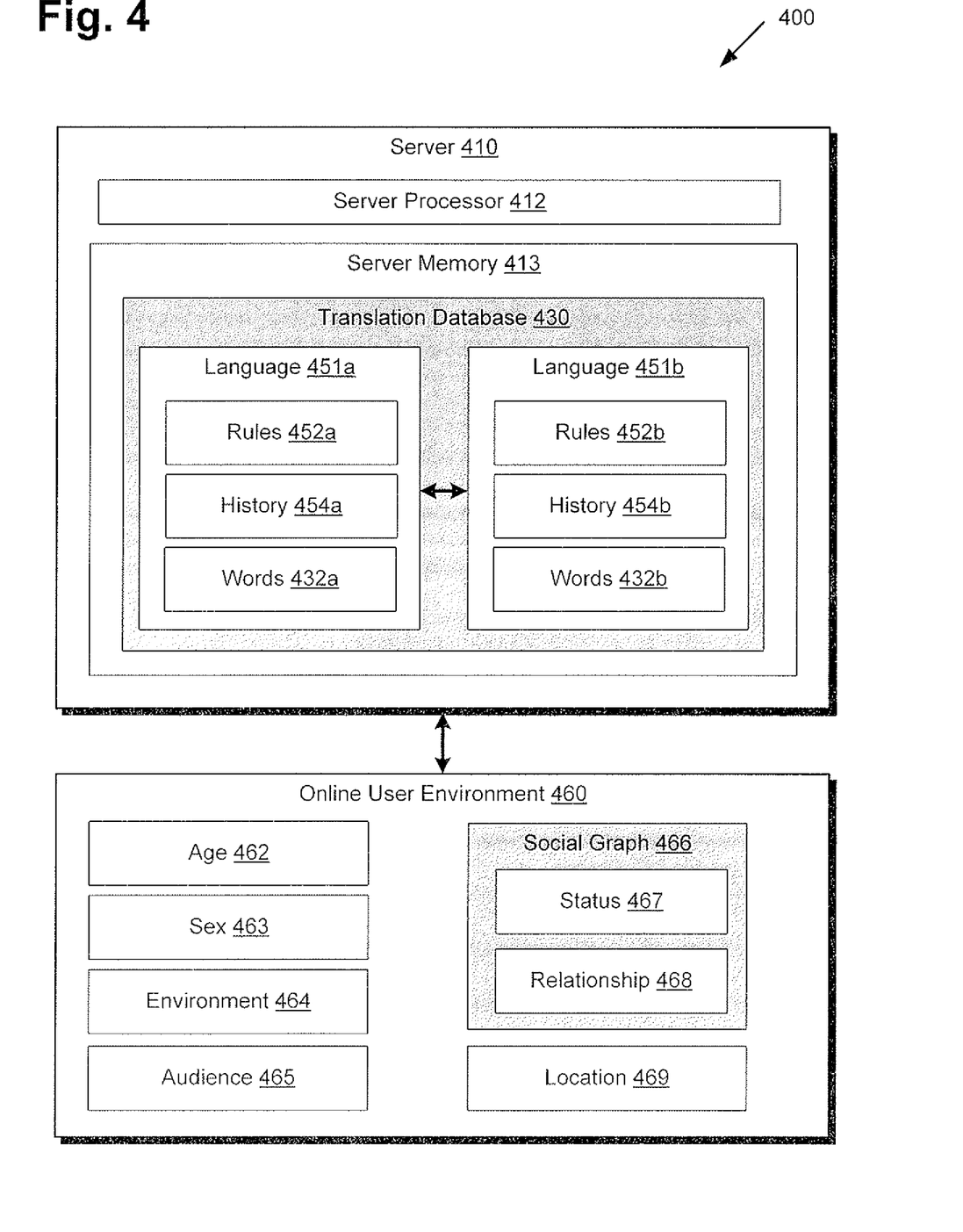
FIG. 4 presents a system for using a product history to create a linguistic corpus for a product, according to one implementation of the present disclosure.

FIG. 4 presents a system for using franchise, linguistic, and social content to support new products, according to one implementation of the present disclosure. FIG. 4 includes server 410 and online user environment 460. Server 410 includes server processor 412 and server memory 413. Server memory 413 includes translation database 430 that includes language 451a and language 451b. Language 451a includes rules 452a, history 454a, and words 432a. Language 451b includes rules 452b, history 454b, and words 432b. Online user environment 460 includes age 462, sex 463, environment 464, audience 465, social graph 466, and location 469. Social graph 466 includes status 467 and relationship 468. With respect to FIG. 4, it should be noted that server 410, server processor 412, server memory 413, and translation database 430 correspond respectively to server 110, server processor 112, server memory 113, and translation database 130 of FIG. 1.

It should further be noted that language 451a and language 451b are collectively referred to as languages 451, rules 452a and rules 452b are collectively referred to as rules 452, history 454a and history 454b are collectively referred to as history 454, and words 432a and words 432b are collectively referred to as words 432.

Online user environment 460 may be an online game, a website, a chat room, a forum, or other environments for communication among users. Online user environment 460 is configured to communicate with server 410 in order to share and exchange necessary information from online user environment 460 with translation database 430. Online user environment 460 may be associated with a particular franchise, such as the "Movie1" franchise, or may be associated with a particular movie, show, game, toy, sport, or any other product that includes or is associated with online user environments.

Age 462 of online user environment 460 may include the age of users in online user environment 460. Age 462 helps translation database 430 establish rules 452, history 454, and words 432 associated with users having age 462. Age 462 may include multiple ages of multiple users ranging from young to old.

Sex 463 of online user environment 460 may include the gender of the users of online user environment 460. Sex 463 provides information to translation database 430 to establish rules 452, history 454, and words 432 associated with users having sex 463. Sex 463 may be male or female.

Environment 464 of online user environment 460 may include a context of a situation in online user environment 460. Environment 464 provides information to translation database 430 to establish rules 452, history 454, and words 432 associated with users in environment 464. For example, environment 464 may be a chat blog about a certain subject, or environment 464 may be a help center for chatting with a service representative about issues the user is experiencing. In such an example, translation database 430 may adjust the translations based on the mood and/or nature of the communication, so as to ensure the most accurate translations are made by translation database 430.

Audience 465 of online user environment 460 may include the audience of the users. Audience 465 provides information to translation database 430 to determine who the user is communicating with in online user environment 460. Audience 465 may be a group of similar aged peers, a group of other users interested in the same product, sport, etc., or possibly a single user in a private chat room or in a 1 on 1 online game.

Location 469 of online user environment 460 may include the location of the users. Location 469 provides information to translation database 430 to determine the languages spoken by users in location 469 and the dialect of languages spoken by users in location 469, for example. Location 469 also helps social graph 466 determine status 467 of users at location 469 (explained in more detail in reference to status 467 below). Location 469 may include one location, or may include a plurality of locations associated with a wide range of different users.

Social graph 466 of online user environment 460 may be configured to make a determination of the status 467 and relationship 468 of users of online user environment 460. Social graph 466 helps translation database 430 determine the proper context and tone of communication in order to have proper structure and formality for the translations done by translation database 430, in order to make more accurate translations for users of online user environment 460.

Status 467 of social graph 466 may include the social status of the users. Status 467 may be determined for the user and audience 465. In some languages, the social status of the person speaking and the social status of the person(s) being talked to is very important in determining the proper words and phrases to use. As such, status 467 is equally as important when determining how to translate words and phrases communicated by users of online user environment 460. For example, in certain languages, the audience, the setting, the environment, and the gender of the person communicating is important, especially to show respect and not to offend others.

Relationship 468 of social graph 466 may include the relationship of the users communicating. Relationship 468 may be determined for the user and audience 465. For example, relationship 468 may be a family, friendly, or work relationship. In some languages, the relationship between the persons communicating is important in determining the proper tone and context of the communication in order to use proper structure and formality in speech. As such, relationship 468 is equally important when determining how to translate words and phrases communicated by users of online user environment 460. For example, in certain languages, an older family member must be addressed more formally while a similar aged friend may use a more casual tone.

Also illustrated in FIG. 2, server 410 includes translation database 430. Server 410 may utilize translation database 430 to store and update languages 451 with rules 452, history 454, and words 432. Server processor 412 may translate between languages 451 during communications between users of online user environment 460. Translation database 430 may be dynamically updated over time as more conversations and translations take place on online user environment 460 and translation database 430.

Languages 451 of translation database 430 may include any number of languages. Each of languages 451 may communicate rules 452, history 454, and words 432 among other languages 451, in order to ensure accurate translations and up to date information for each of languages 451 on translation database 430. For example, language 451a may be English while language 451b is Japanese.

Although the implementation shown in FIG. 4 includes language 451a and language 451b, the present disclosure is not limited to the implementation of FIG. 4. In some implementations, there may be only one, or any number of languages 451.

Rules 452 of languages 451 may include rules that are created based on age 462, sex 463, environment 464, audience 465, location 469, and social graph 466 including status 467 and relationship 468. Rules 452 are translation rules for determining the best translations for the current users of online user environment 460. Rules 452 may be updated dynamically for each type of online user environment 460. In some implementations, rules 452 may be updated and applied during a single use of online user environment 460. For example, if online user environment includes all males at one time, but later includes a female, rules 452 may change or be updated based on the change in online user environment 460.

History 454 of languages 451 may include a history of translations made by translation database 430 for languages 451. Using history 454, more accurate rules 452 and translations can be made. For example, when a new product is created, such as product 140c of FIG. 1, new phrases or words that are associated with product 140c may be used by users of product 140c. In such an example, the new words and phrases must be translated to different languages based on the users in online user environment 460. As such, once history 454 is updated with the translations for product 140c, future products similar to product 140c can use history 454 to implement rules 452 and words 452 with the future products.

Words 432 of languages 451 may include the words and phrases used in languages 451. Words 432 may especially include at least some of the words and phrases used by users of online user environment 460. Words 432 may include words and phrases associated with a franchise, a product, or other interests of users of online user environment 460.

Figure 5:
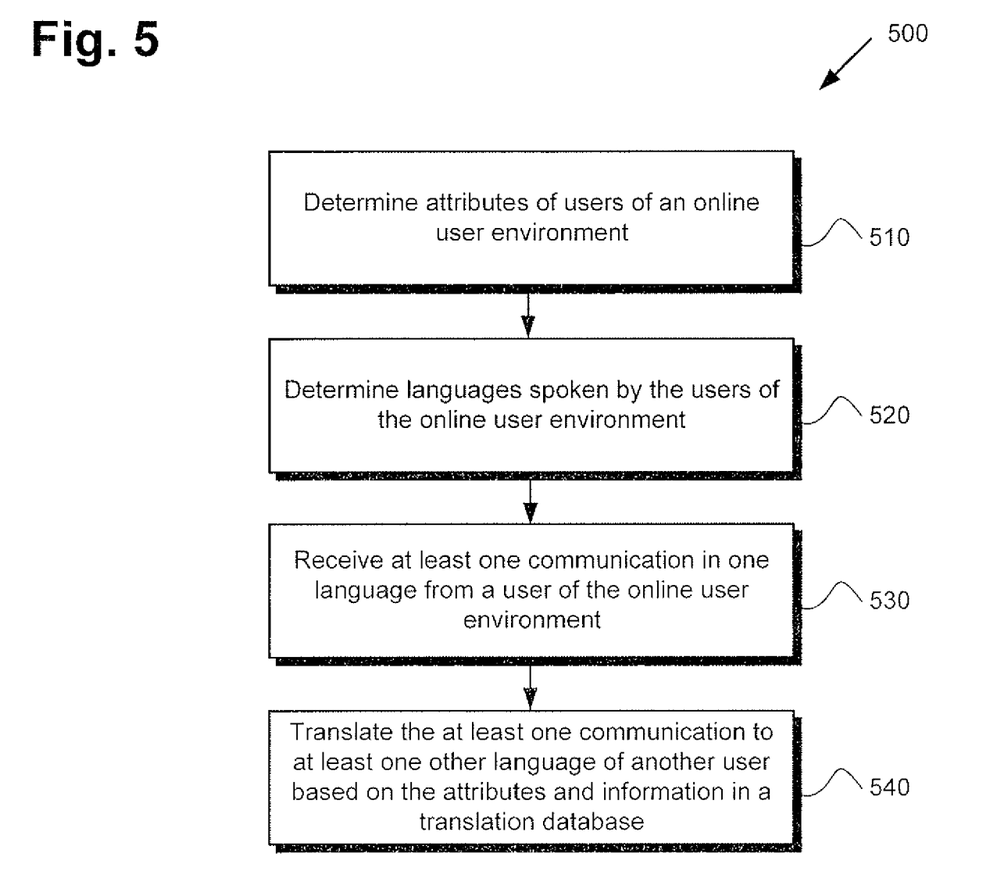
FIG. 5 presents a flowchart illustrating a method of using a product history to create a linguistic corpus for a product, according to one implementation of the present disclosure.

FIG. 5 presents a flowchart illustrating a method of using linguistic and social content to support new products, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 4, the disclosed inventive concepts are not intended to be limited by specific features shown and described with respect to FIG. 4. Furthermore, with respect to the method illustrated in FIG. 5, it is noted that certain details and features have been left out of flowchart 500 in order not to obscure the discussion of inventive features in the present application.

Referring now to FIG. 5, flowchart 500 (at 510) includes determining attributes of users of an online user environment. For example, server processor 412 of server 410 may determine the attributes, where the attributes include age 462, sex 463, environment 464, audience 465, location 469, and social graph 466 including status 467 and relationship 468 of the users of online user environment 460. In addition to the attributes shown in online user environment 460 of FIG. 4, other attributes may also be determined.

Referring again to FIG. 5, flowchart 500 (at 520) includes determining languages spoken by users of the online user environment. For example, server processor 412 of server 410 may determine languages 451 spoken by users of online user environment 460. In such an example, a first user of online user environment 460 may be speaking language 451a while a second user of online user environment 460 may be speaking language 451b. Server 110 may determine languages 451 used by the users of online user environment 460 based on the words 432 of languages, or may generally determine languages 451 based on location 469 of the users.

Referring again to FIG. 5, flowchart 500 (at 530) includes receiving at least one communication in one language from a user of the online user environment. For example, server processor 412 of server 410 may receive at least one communication in language 451a from a user of online user environment 460. In such an example, the communication could be directed to another user speaking language 451b in online user environment 460.

Referring again to FIG. 5, flowchart 500 (at 540) includes translating the at least one communication to at least one other language based on the attributes and information in a translation database. For example, server processor 412 of server 410 may translate the communication from the user speaking language 451a to language 451b using the attributes of users in online user environment 460 and the information in translation database 430. The information in translation database 430 may include rules 452, history 454, and words 432. The translation is done by translation database 430 using rules 432, history 454, and words 432 in view of the attributes of the users of online user environment 460 to ensure an accurate and proper translation is made.

For example, the communication may be in English from a teenager and be directed to a Japanese speaking adult. In such an example, age 462 and status 467 are important, so translation database 430 uses rules 452, history 454, and words 432 to determine the most accurate translation taking into account that the adult male is not only older but likely of a higher social status than the teenager, and thus the translation should be more formal. This translation can account for the attributes of online user environment 460 even if the teenager is unaware of the proper context and formality of the Japanese language to ensure that the teenager does not offend the adult male.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a memory storing a software application, the software application including a movie database, the movie database including a movie history for each of a plurality of movies; and
a processor configured to execute the software application to:
receive attributes for a new movie;
determine at least one related movie from the plurality of movies based on the attributes for the new movie, the attributes including an age range and linguistic safety restrictions based at least in part on the age range;
create a linguistic corpus for the new movie based on the movie history of the at least one related movie, the movie history including a historical language translation information associated with the at least one related movie, the historical language translation information including at least one language translation from one spoken language to another spoken language for users, wherein the at least one language translation takes into account the linguistic safety restrictions based at least in part on the age range;
translate, using the created linguistic corpus for the new movie, words of the new movie spoken in the one spoken language to the another spoken language, wherein the translating comprises selecting between a first set of translated words and a second set of translated words based at least in part on the age range; and
provide the new movie including the translated words to the users.

2. The system of claim 1, wherein the creating of the linguistic corpus for the new movie includes weighing the movie history to determine a frequency of elements of the movie history and a relevance of the movie history to the attributes for the new movie.

3. The system of claim 2, wherein the elements of the movie history include at least one of words, behaviors, rules, or advertisements.

4. The system of claim 2, wherein the creating the linguistic corpus includes selecting the elements of the movie history of the at least one related movie in addition to new elements associated with the new movie to include in the linguistic corpus of the new movie.

5. The system of claim 1, wherein the movie history further includes tags associated with the at least one related movie.

6. The system of claim 5, wherein the tags include at least one of a franchise tag, a title tag, an age group tag, or a language tag.

7. The system of claim 5, wherein the creating the linguistic corpus utilizes at least one of the tags or the historical language translation information to determine words and a translation of the determined words to include in the linguistic corpus.

8. A method being executed by a system including a processor and a memory storing a software application, the software application including a movie database, the movie database including a movie history for each of a plurality of movies, the method comprising:
receiving, using the processor, attributes for a new movie;
determining, using the processor, at least one related movie from the plurality of movies based on the attributes for the new movie, the attributes including an age range and linguistic safety restrictions based at least in part on the age range;
creating, using the processor, a linguistic corpus for the new movie based on the movie history of the at least one related movie, the movie history including a historical language translation information associated with the at least one related movie, the historical language translation information including at least one language translation from one spoken language to another spoken language for users, wherein the at least one language translation takes into account the linguistic safety restrictions based at least in part on the age range;
translating, using the processor and the created linguistic corpus for the new movie, words of the new movie spoken in the one spoken language to the another spoken language, wherein the translating comprises selecting between a first set of translated words and a second set of translated words based at least in part on the age range; and
providing, using the processor, the new movie including the translated words to the users.

9. The method of claim 8, wherein the creating of the linguistic corpus for the new movie includes weighing the movie history to determine a frequency of elements of the movie history and a relevance of the movie history to the attributes for the new movie.

10. The method of claim 9, wherein the elements of the movie history include at least one of words, behaviors, rules, or advertisements.

11. The method of claim 9, wherein the creating the linguistic corpus includes selecting the elements of the movie history of the at least one related movie in addition to new elements associated with the new movie to include in the linguistic corpus of the new movie.

12. The method of claim 8, wherein the movie history further includes tags associated with the at least one related movie.

13. The method of claim 12, wherein the tags include at least one of a franchise tag, a title tag, an age group tag, or a language tag.

14. The method of claim 12, wherein the creating utilizes at least one of the tags or the historical language translation information to determine words and a translation of the determined words to include in the linguistic corpus.

15. The system of claim 1, wherein a complexity of the translated words is based at least in part on the age range.

16. The method of claim 8, wherein a complexity of the translated words is based at least in part on the age range.

* * * * *